United States Patent
Yan et al.

(10) Patent No.: US 9,083,249 B2
(45) Date of Patent: Jul. 14, 2015

(54) MIXED CONTROL METHOD FOR RESONANT CONVERTER, RESONANT CONVERTER SYSTEM AND MIXED CONTROLLER

(71) Applicant: DELTA ELECTRONICS, INC., Taoyuan Hsien (TW)

(72) Inventors: Chao Yan, Taoyuan Hsien (TW); Lihao Yan, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 376 days.

(21) Appl. No.: 13/771,690

(22) Filed: Feb. 20, 2013

(65) Prior Publication Data

US 2014/0092634 A1   Apr. 3, 2014

(30) Foreign Application Priority Data

Sep. 29, 2012  (CN) .......................... 2012 1 0370565

(51) Int. Cl.
*H02M 3/335* (2006.01)
*H02M 3/337* (2006.01)
*H02M 1/00* (2007.01)

(52) U.S. Cl.
CPC ........ *H02M 3/33507* (2013.01); *H02M 3/3376* (2013.01); *H02M 2001/0058* (2013.01); *Y02B 70/1433* (2013.01); *Y02B 70/1491* (2013.01)

(58) Field of Classification Search
CPC ....... H02M 3/28; H02M 3/335; H02M 3/338; H02M 2001/0058
USPC ............... 323/271, 285; 363/17, 21.02, 21.01
See application file for complete search history.

(56) References Cited

U.S. PATENT DOCUMENTS

| | | | |
|---|---|---|---|
| 7,796,406 B2 * | 9/2010 | Lev | 363/21.02 |
| 2008/0247194 A1 * | 10/2008 | Ying et al. | 363/17 |
| 2011/0103097 A1 * | 5/2011 | Wang et al. | 363/17 |
| 2011/0149608 A1 * | 6/2011 | Halberstadt | 363/21.02 |

* cited by examiner

*Primary Examiner* — Matthew Nguyen
*Assistant Examiner* — Kyle J Moody
(74) *Attorney, Agent, or Firm* — Lowe Hauptman & Ham, LLP

(57) ABSTRACT

The present application provides a mixed control method for a resonant converter, a resonant converter system and a mixed controller. When the resonant converter operates in a case where a voltage gain is less than a predetermined value, the method includes: setting a mixed control start frequency, a mixed control stop frequency and a slope of a phase-shifting angle; detecting an operating frequency of the converter; calculating a time delay of phase shifting according to the slope, the mixed control start frequency, the mixed control stop frequency and a resonant frequency of the resonant converter; and according to the time delay, the mixed control start and stop frequencies, generating a control signal to adjust the operating frequency and the phase-shifting angle of the resonant converter. The present application can realize a relatively low voltage gain and a small circuit loss, thereby the circuit efficiency may be improved.

33 Claims, 12 Drawing Sheets

MIXED CONTROL METHOD FOR RESONANT CONVERTER, RESONANT CONVERTER SYSTEM AND MIXED CONTROLLER

TECHNICAL FIELD

The present application relates to a type of controlling for resonant converters, specifically, to a mixed control method for a resonant converter, a resonant converter system and a mixed controller.

BACKGROUND

Like most of the power supply products, DC/DC converters are developing towards high efficiency, high power density, high reliability and low cost. Since resonant converters usually employ a control method of Pulse Frequency Modulation (PFM), it is relatively easy to realize a zero voltage switching of switches therein and it is easy to meet the high efficiency and high power density requirements for converters. Thus, the resonant converters are widely used.

Although the resonant converters have advantages, such as high conversion efficiency, under a normal operation state, i.e., under a situation where a voltage gain is greater than or equal to a predetermined value, there are still some problems existing in the resonant converter which only employs frequency changing control when it operates under an abnormal operation state, e.g., when the voltage gain is less than the predetermined value (e.g., under a state where the circuit is started or an output current is limited or the like). When the resonant converter operates under a situation where the voltage gain is less than the predetermined value, the voltage gain of the circuit is required to be relatively low; especially, when the output current is limited, corresponding control needs to be applied on the current of the circuit to make the circuit be capable of operating normally. To meet these requirements, it is necessary to increase an operating frequency of the resonant converter. However, an increase of frequency means an increase of circuit loss. When the frequency is increased to a particular value, the entire loss of the converter will go beyond the capacity of the converter and then the converter will be damaged. FIG. 1 is a schematic diagram illustrating such a control method of only changing frequency, in which the abscissa represents a ratio $f_n$ of an operating frequency of a circuit to a resonant frequency of the resonant circuit, and the ordinate represents a phase-shifting angle θ.

The above control method of only changing frequency cannot resolve the problem of overlarge circuit loss which occurs when the voltage gain is less than the predetermined value. Another control method employs a method of both changing frequency and changing pulse width. As shown in FIG. 2, the abscissa represents the ratio $f_n$ of the operating frequency of the circuit to the resonant frequency of the resonant circuit, and the ordinate represents a duty cycle D of switches. The circuit follows an operation locus as below: firstly, from A to B, the circuit being controlled to operate through changing the duty cycle D of switches, and then entering into a BC stage in which the circuit is controlled to operate by adjusting the pulse width of the switches. Since the method of changing the pulse width is employed, the switching frequency is lower than that in the method of only changing frequency under the same gain. However, a hard-switching of switches at primary side may be brought out by reducing the pulse width, thereby resulting in that the entire loss is still large.

SUMMARY OF THE INVENTION

In view of the above problems, the present application provides a mixed control method for a resonant converter, a resonant converter system and a mixed controller so as to easily realize a relatively low voltage gain and to have a relatively small circuit loss when the resonant converter operates under a situation where the voltage gain is less than a predetermined value, thereby increasing circuit efficiency.

To achieve the above object, one aspect of the present application provides a mixed control method for resonant converter. When the resonant converter operates in a case where a voltage gain is less than a predetermined value, the method includes the steps of: setting a mixed control start frequency, a mixed control stop frequency and a slope of a phase-shifting angle; detecting an operating frequency of the resonant converter; calculating a time delay of phase shifting according to the slope of the phase-shifting angle, the mixed control start frequency, the mixed control stop frequency and a resonant frequency of the resonant converter; and according to the time delay of phase shifting, the mixed control start frequency and the mixed control stop frequency, generating a control signal to adjust the operating frequency and the phase-shifting angle of the resonant converter.

In an embodiment, the step of calculating a time delay of phase shifting includes: calculating the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

In an embodiment, the case when a voltage gain is less than a predetermined value is the case when a value of an output current of the resonant converter is greater than or equal to $C_4 * I_{o\_max}$, where $C_4$ is a constant between 0 and 1, preferably is a constant between 0.8 and 1, and $I_{o\_max}$ is a maximum value of the output current of the resonant converter when the voltage gain is greater than or equal to the predetermined value.

In an embodiment, when the value of the output current of the resonant converter is less than $C_4 * I_{o\_max}$, a frequency changing control is performed on the resonant converter.

In an embodiment, the mixed control start frequency and the mixed control stop frequency are set by the following two equations respectively:

$$f_{start} = C_1 \cdot I_{o\_max} + C_2,$$

$$f_{stop} = C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and the constants $C_1$, $C_2$ and $C_3$ are calculated by two groups of mixed control start frequencies and mixed control stop frequencies which are set in advance.

In an embodiment, the slope of the phase-shifting angle is obtained according to an equation $$s = \frac{\theta \cdot F_s}{f_{stop} - f_{start}},$$

where θ is a pre-set phase-shifting angle; two mixed control stop frequencies which are set in advance are a first mixed control stop frequency $f_{stop1}$ and a second mixed control stop frequency $f_{stop2}$, which are obtained by the following steps of: under the same output voltage of the resonant converter, setting a first pre-set phase-shifting angle under a first maximum value of the output current and a second pre-set phase-shifting angle under a second maximum value of the output current; and in order to control the output current in the case where the voltage gain is less than the predetermined value, using frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

In an embodiment, the first pre-set phase-shifting angle equals to the second pre-set phase-shifting angle.

In an embodiment, both of the first pre-set phase-shifting angle and the second pre-set phase-shifting angle are 60~120°.

In an embodiment, both of the first pre-set phase-shifting angle and the second pre-set phase-shifting angle are 90°.

In an embodiment, two mixed control start frequencies which are set in advance are a first mixed control start frequency $f_{start1}$ and a second mixed control start frequency $f_{start2}$, which are obtained by the following steps of: setting the first mixed control start frequency $f_{start1}$ as 1~1.3 times as much as the resonant frequency $F_s$, and calculating the second mixed control start frequency $f_{start2}$ by an equation $$f_{start2} = f_{stop2} \cdot \frac{f_{start1}}{f_{stop1}}.$$

In an embodiment, the first mixed control start frequency $f_{start1}$ is 1.1 times as much as the resonant frequency $F_s$.

The second aspect of the present application provides a resonant converter system which includes: a resonant converter; a detection device which detects an operating frequency of the resonant converter; and a mixed controller which, when the resonant converter operates in a case where a voltage gain is less than a predetermined value, calculates a time delay of phase shifting according to a mixed control start frequency, a mixed control stop frequency and a slope of a phase-shifting angle which are set in advance and the operating frequency, and generates a control signal according to the time delay of phase shifting, the mixed control start frequency and the mixed control stop frequency to adjust the operating frequency and phase-shifting angle of the resonant converter.

In an embodiment, the mixed controller is configured to calculate the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

In an embodiment, the case when a voltage gain is less than a predetermined value is the case when a value of an output current of the resonant converter is greater than or equal to $C_4*I_{o\_max}$, where $C_4$ is a constant between 0 and 1, and preferably is a constant between 0.8 and 1, and $I_{o\_max}$ is a maximum value of the output current of the resonant converter when the voltage gain is greater than or equal to the predetermined value.

In an embodiment, when the value of the output current of the resonant converter is less than $C_4*I_{o\_max}$, the mixed controller performs a frequency changing control on the resonant converter.

In an embodiment, the mixed control start frequency and the mixed control stop frequency are set by the following two equations respectively:

$$f_{start}=C_1 \cdot I_{o\_max}+C_2,$$

$$f_{stop}=C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and the constants $C_1$, $C_2$ and $C_3$ are calculated by two groups of mixed control start frequency and mixed control stop frequency which are set in advance.

In an embodiment, the slope of the phase-shifting angle is obtained according to an equation $$s = \frac{\theta \cdot F_s}{f_{stop} - f_{start}},$$

where θ is a pre-set phase-shifting angle; two mixed control stop frequencies which are set in advance are a first mixed control stop frequency $f_{stop1}$ and a second mixed control stop frequency $f_{stop2}$, the mixed controller sets, under the same output voltage of the resonant converter, a first pre-set phase-shifting angle under a first maximum value of the output current and a second pre-set phase-shifting angle under a second maximum value of the output current, and in order to control the output current in the case where the voltage gain is less than the predetermined value, uses frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

In an embodiment, the first pre-set phase-shifting angle equals to the second pre-set phase-shifting angle.

In an embodiment, both of the first pre-set phase-shifting angle and the second pre-set phase-shifting angle are 60~120°.

In an embodiment, both of the first pre-set phase-shifting angle and the second pre-set phase-shifting angle are 90°.

In an embodiment, two mixed control start frequencies which are set in advance are a first mixed control start frequency $f_{start1}$ and a second mixed control start frequency $f_{start2}$; the mixed controller sets the first mixed control start frequency $f_{start1}$ as 1~1.3 times as much as the resonant frequency $F_s$, and calculates the second mixed control start frequency by an equation $$f_{start2} = f_{stop2} \cdot \frac{f_{start1}}{f_{stop1}}.$$

In an embodiment, the first mixed control start frequency $f_{start1}$ is 1.1 times as much as the resonant frequency $F_s$.

The third aspect of the present application provides a mixed controller which includes a receiving port which receives an operating frequency signal of a resonant converter to obtain an operating frequency of the resonant converter; when the resonant converter operates in a case where a voltage gain is less than a predetermined value, the mixed controller calculates a time delay of phase shifting according to a mixed control start frequency, a mixed control stop frequency and a slope of a phase-shifting angle which are set in advance and the operating frequency, and generates a control signal according to the time delay of phase shifting, the mixed control start frequency and the mixed control stop frequency to adjust the operating frequency and phase-shifting angle of the resonant converter.

In an embodiment, the mixed controller is configured to calculate the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

In an embodiment, the case when a voltage gain is less than a predetermined value is the case when a value of an output current of the resonant converter is greater than or equal to $C_4 * I_{o\_max}$, where $C_4$ is a constant between 0 and 1, and preferably is a constant between 0.8 and 1, and $I_{o\_max}$ is a maximum value of the output current of the resonant converter when the voltage gain is greater than or equal to the predetermined value.

In an embodiment, when the value of the output current of the resonant converter is less than $C_4 * I_{o\_max}$, the mixed controller performs a frequency changing control on the resonant converter.

In an embodiment, the mixed control start frequency and the mixed control stop frequency are set by the following two equations respectively:

$$f_{start} = C_1 \cdot I_{o\_max} + C_2,$$

$$f_{stop} = C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and the constants $C_1$, $C_2$ and $C_3$ are calculated by two sets of mixed control start frequency and mixed control stop frequency which are set in advance.

In an embodiment, the slope of the phase-shifting angle is obtained according to an equation $$s = \frac{\theta \cdot F_s}{f_{stop} - f_{start}},$$

where θ is a pre-set phase-shifting angle; two mixed control stop frequencies which are set in advance are a first mixed control stop frequency $f_{stop1}$ and a second mixed control stop frequency $f_{stop2}$, the mixed controller sets, under the same output voltage of the resonant converter, a first pre-set phase-shifting angle under a first maximum value of the output current and a second pre-set phase-shifting angle under a second maximum value of the output current, and in order to control the output current in the case where the voltage gain is less than the predetermined value, uses frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

In an embodiment, the first pre-set phase-shifting angle equals to the second pre-set phase-shifting angle.

In an embodiment, both of the first pre-set phase-shifting angle and the second pre-set phase-shifting angle are 60~120°.

In an embodiment, both of the first pre-set phase-shifting angle and the second pre-set phase-shifting angle are 90°.

In an embodiment, two mixed control start frequencies which are set in advance are a first mixed control start frequency $f_{start1}$ and a second mixed control start frequency $f_{start2}$, the mixed controller is configured to set the first mixed control start frequency $f_{start1}$ as 1~1.3 times as much as the resonant frequency $F_s$, and to calculate the second mixed control start frequency by an equation $$f_{start2} = f_{stop2} \cdot \frac{f_{start1}}{f_{stop1}}.$$

In an embodiment, the first mixed control start frequency $f_{start1}$ is 1.1 times as much as the resonant frequency $F_s$.

It can be seen from the above technical solutions that, the present application has the following advantageous effects: when a resonant converter operates in a case where a voltage gain is less than a predetermined value, it is easy to realize a relatively low voltage gain and a small circuit loss, thereby improving circuit efficiency.

By the following description on the embodiments with reference to figures, the above and other objects, features and advantages of the present application will become more apparent.

DESCRIPTION OF THE EMBODIMENTS

Specific embodiments of the present application will be described below in detail. It should be noted that, the embodiments described here are only for illustration but not to limit the present application. Furthermore, in the following description, "an embodiment" or "embodiment" that appears in different parts does not necessarily refer to the same embodiment. In addition, particular features, structures or characteristics in one or more embodiments may be combined in any suitable form.

Figure 1:
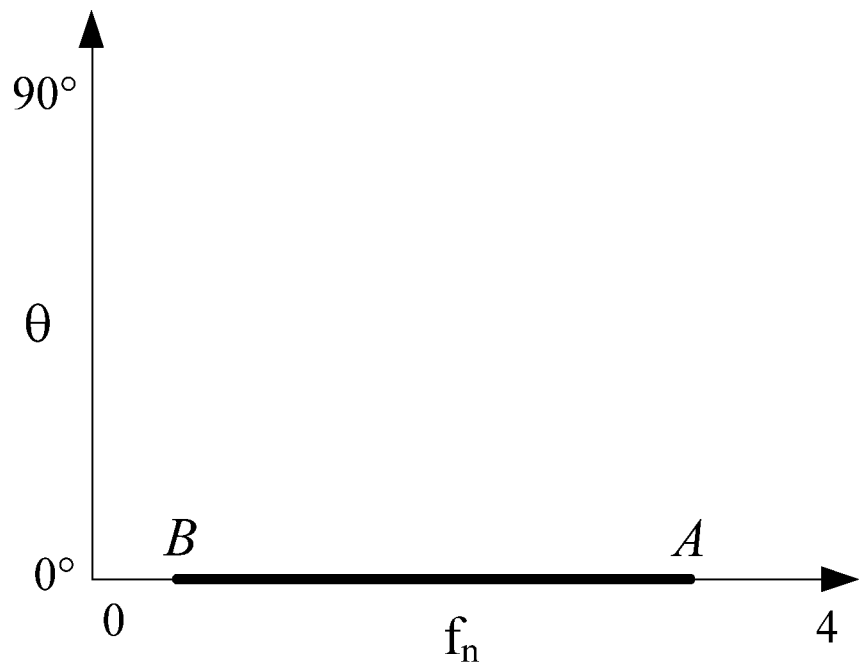
FIG. 1 is a schematic diagram illustrating a control method of only changing frequency for a resonant converter in prior art.
Figure 2:
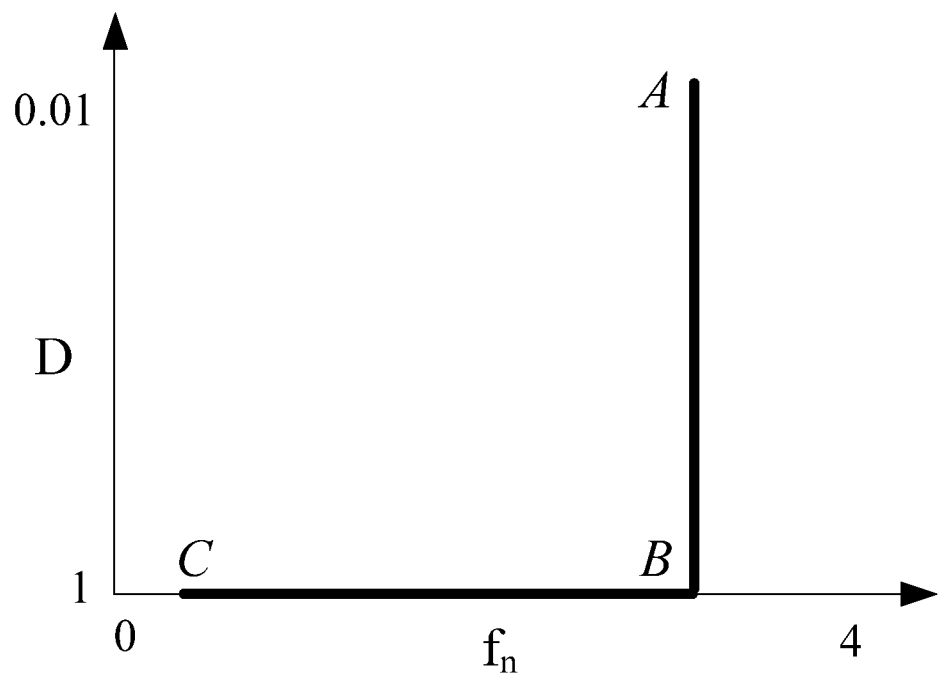
FIG. 2 is a schematic diagram illustrating a control method of changing frequency and duty cycle for a resonant converter in prior art.
Figure 3:
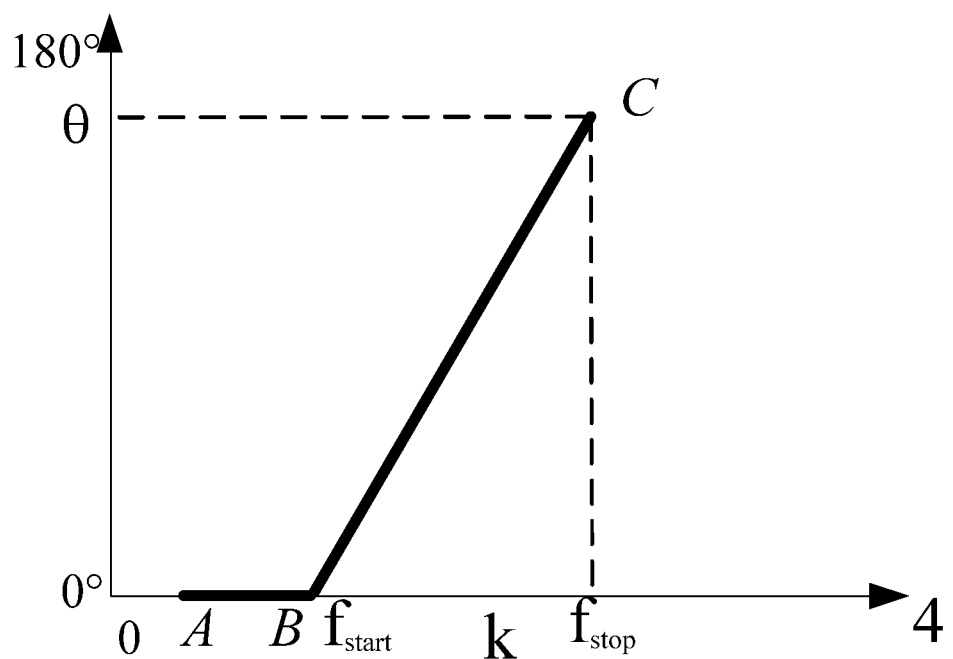
FIG. 3 is a schematic diagram illustrating a mixed control method of shifting phase and changing frequency for a resonant converter according to an embodiment of the present application.

FIG. 3 is a schematic diagram illustrating a mixed control method for a resonant converter with phase shifting and frequency changing according to an embodiment of the present application, where the abscissa represents a ratio k (hereinafter referred to as a frequency ratio) of an operating frequency f of the resonant converter to a resonant frequency $F_s$ of the resonant circuit, and the ordinate represents a phase-shifting angle θ. In the present embodiment, the method includes two control stages: when a voltage gain is relatively high (the frequency is relatively low at this time), a control method of only changing frequency is employed, i.e., for k from point A to point B as shown in FIG. 3, the control method of only changing frequency is employed; and when the voltage gain is relatively low (the frequency is relatively high at this time), a control method of phase shifting plus frequency changing is employed, i.e., for k from point B (the frequency is $f_{start}$) to point C (the frequency is $f_{stop}$) as shown in FIG. 3, the control method of phase shifting plus frequency changing is employed. Here, when the frequency changes from $f_{start}$ to $f_{stop}$, the phase-shifting angle changes linearly at the same time instead of changing at a fixed frequency point, such a linear change makes the phase-shifting angle become larger as the frequency increases so as to easily realize a Zero Voltage Switching (ZVS), i.e., a soft-switching, and a smaller circuit loss is realized so that the circuit efficiency can be increased when the resonant converter operates in a case where a voltage gain is less than a predetermined value. The predetermined value may substantially be 1. Certainly, the predetermined value may be set as other values according to actual situations.

In another embodiment, according to actual operation situations of the resonant converter, the mixed control method may only include one control stage: only employing the control method of phase shifting plus frequency changing.

The above phrase "a voltage gain is less than a predetermined value" refers to a state where the voltage gain of the resonant converter is relative low, e.g., the voltage gain is less than 1. When the voltage gain is less than the predetermined value, the resonant converter may, for example, operate in a start-up state or in a state where the output current is limited, and the like.

In an embodiment, the case when the voltage gain is less than the predetermined value refers to the case when a value of the output current of the resonant converter is greater than or equal to $C_4 * I_{o\_max}$, where $C_4$ is a constant between 0 and 1, preferably is a constant between 0.8 and 1, and $I_{o\_max}$ is a maximum value of the output current of the resonant converter when the voltage gain is greater than or equal to the predetermined value.

Figure 4:
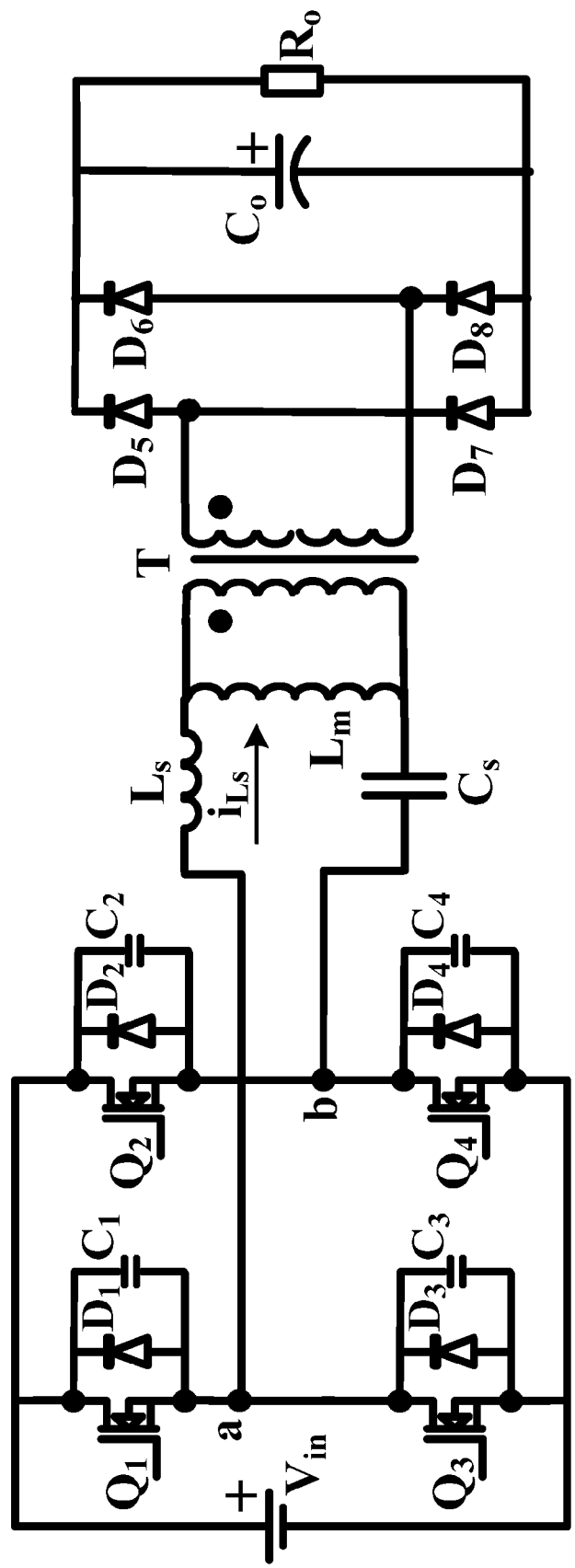
FIG. 4 is a structure of a typical full-bridge LLC circuit.

The method proposed by the present application will be described below using a LLC circuit among the resonant converters as an example. FIG. 4 shows a structure of a typical full-bridge LLC circuit, where switches (eg., transistor or mosfet) $Q_1$ and $Q_3$, $Q_2$ and $Q_4$ form two bridge arms, the reference signs $D_1$, $D_2$, $D_3$ and $D_4$ indicate parasitic diodes of the switches $Q_1$, $Q_2$, $Q_3$ and $Q_4$ respectively, and the reference signs $C_1$, $C_2$, $C_3$ and $C_4$ indicate junction capacitors of the switches $Q_1$, $Q_2$, $Q_3$ and $Q_4$ respectively. When employing the control of frequency changing, driving signals of the switches $Q_1$ and $Q_4$, and driving signals of the switches $Q_2$ and $Q_3$, signals of which are complementary with signals of the switches $Q_1$ and $Q_4$, switch at a duty cycle close to 50%. Between midpoints a and b of the bridge arms, a resonant inductor $L_s$, a primary side of a transformer T and a resonant capacitor $C_s$ are connected in series, and a magnetizing inductor $L_m$ is connected with the primary side of the transformer T in parallel. A secondary side of the transformer employs a full-bridge structure which uses four diodes $D_5$ and $D_8$, $D_6$ and $D_7$ to perform full-bridge rectification, and a capacitor $C_0$ is employed directly at the output side to perform filtering and voltage stabilization.

Figure 5:
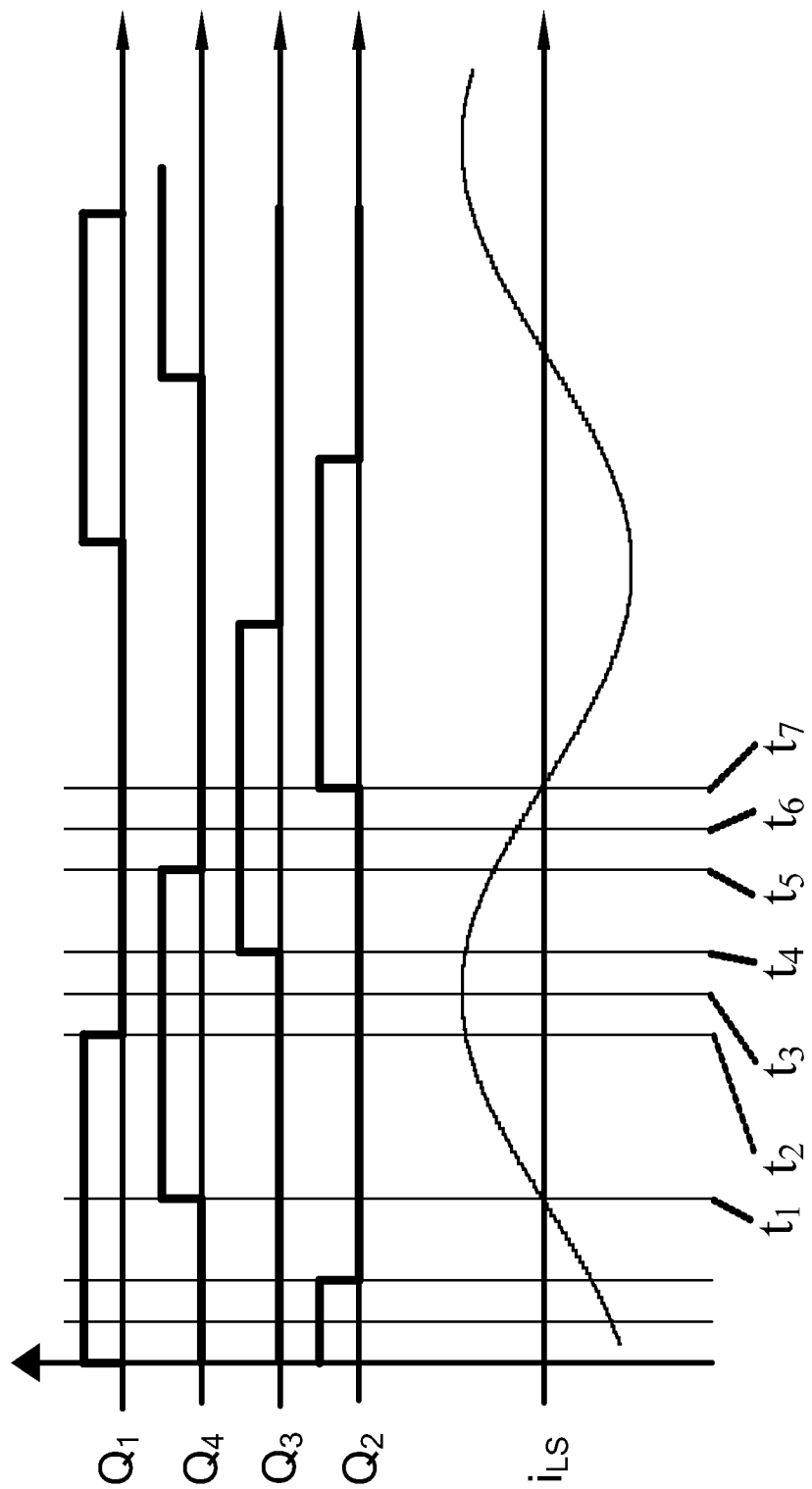
FIG. 5 is a sequence diagram of a mixed control method of shifting phase and changing frequency for a resonant converter according to an embodiment of the present application.

When operating in a start-up state or in a state where the current is limited, a DC voltage gain of LLC is usually low, and the operating frequency of LLC is relatively high, usually greater than the resonant frequency. At this time, the circuit is degraded from a LLC resonance into a LC resonance. FIG. 5 shows an application of the control of phase shifting plus frequency changing on the LLC-SRC as shown in FIG. 4. The switches $Q_1$, $Q_3$ and switches $Q_2$, $Q_4$ of the two bridge arms are complementarily turned on, and the switches $Q_1$ and $Q_4$ are not turned on at the same time but with a certain phase angle shifted. The phase-shifting angle θ is defined as a ratio of a time period from $t_2$ to $t_5$ to a half of a switch period multiplied by 360°. During the time period from $t_1$ to $t_2$, the switches $Q_1$ and $Q_4$ are turned on and the switches $Q_2$ and $Q_3$ are turned off. During this time period, current $i_{LS}$ resonantly rises, the resonant capacitor $C_s$ and the resonant inductor $L_s$ resonate and output energy to the secondary side. At time point $t_2$, the switch $Q_1$ is turned off, and then the junction capacitor $C_3$ of the switch $Q_3$ is discharged by the current $i_{LS}$ while the junction capacitor $C_1$ of the switch $Q_1$ is charged by the current $i_{LS}$ until time point $t_3$. At this time, the voltage across the switch $Q_1$ rises to an input voltage $V_{in}$ whereas the voltage across the switch $Q_3$ becomes zero. Then, the diode $D_3$ which is anti-parallel connected to the switch $Q_3$ is turned on. The resonant capacitor $C_s$ and the resonant inductor $L_s$ resonate and continue to output energy to the secondary side. At time point $t_4$, the switch $Q_3$ is zero voltage turned on, and the resonant capacitor $C_s$ and the resonant inductor $L_s$ continue to resonate. At time point $t_5$, the switch $Q_4$ is turned off, the current $i_{LS}$ is still positive, and the junction capacitor $C_2$ of the switch $Q_2$ is discharged by the current $i_{LS}$ while the junction capacitor $C_4$ of the switch $Q_4$ is charged by the current $i_{LS}$ until time point $t_6$. At this time, the voltage across the switch $Q_4$ rises to the input voltage $V_{in}$ whereas the voltage across the switch $Q_2$ becomes zero. Then the diode $D_2$ which is anti-parallel connected to the switch $Q_2$ is turned on. At time point $t_7$, the switch $Q_2$ is zero voltage turned on. At this time, the resonant inductor $L_s$, the transformer T and the resonant capacitor $C_s$ resonate under the input voltage $V_{in}$ to make the current $i_{LS}$ decrease gradually to become a negative value, and then, working process of another half-cycle begins.

The phase-shifting control may reduce the DC voltage gain by increasing the phase-shifting angle θ so as to obtain a relatively smaller operating frequency under the same gain conditions as compared with the control method of only changing frequency. The phase-shifting control may realize a soft-switching. The bridge arm containing the switches $Q_1$ and $Q_3$ is defined as a leading bridge arm, and the bridge arm containing the switches $Q_2$ and $Q_4$ is defined as a lagging bridge arm. In the control of phase shifting plus frequency changing, whether the switches at the primary side can be zero voltage turned on and off depends on the magnitude of the primary side current $i_{LS}$ at the time when the switches in the lagging bridge arm are turned off. The larger the phase-shifting angle is, the smaller the primary side current at the time when the switches in the lagging bridge arm are turned off is, and thereby a soft-switching of the switches will be more difficult to realize. Thus, under a certain input and output condition, for realizing a soft-switching of the switches, the phase-shifting angle may have a maximum value $θ_{max}$.

The working process of phase shifting is described above using the LLC circuit structure as an example. Those skilled in the art will understand that, the resonant converters to which the mixed control method of the present application is applied are not limited to the above LLC circuit structure, and those skilled in the art may apply the control method proposed by the present application to various types of resonant converters, including but not limited to DC/DC resonant converters and DC/AC resonant converters, as necessary.

Figure 6:
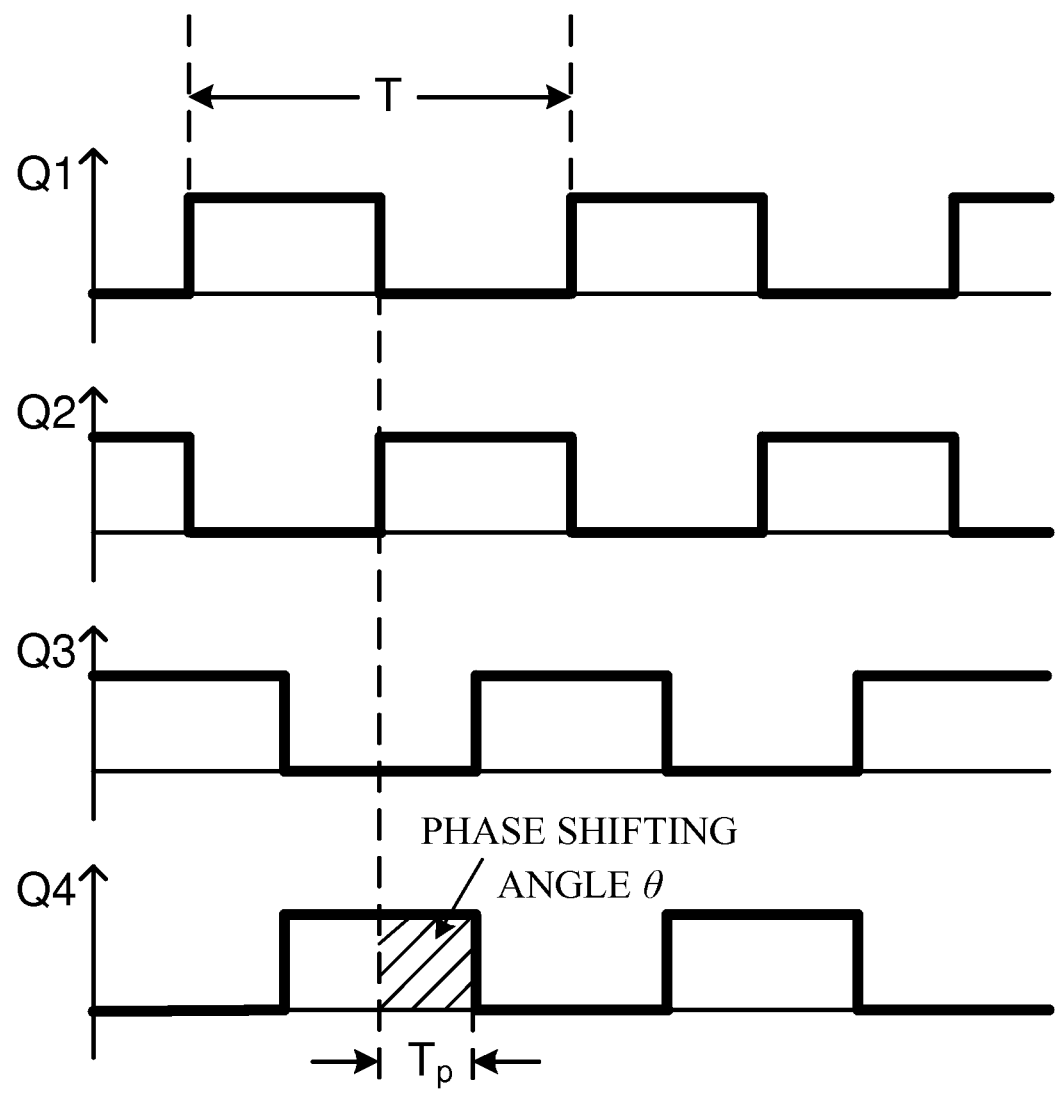
FIG. 6 is a diagram illustrating phase shifting principles of the switches.

FIG. 6 is a schematic diagram illustrating the phase shifting principles of the switches $Q_1$, $Q_3$, $Q_2$ and $Q_4$. Referring to FIG. 6, the switches $Q_1$, $Q_3$ and switches $Q_2$, $Q_4$ are turned on complementarily. Here, the phase-shifting angle θ of the resonant circuit is represented by an angle of phase shifting of the switch $Q_4$ with respect to the switch $Q_1$. T is a switching period of the switches, and has the following relationship with the switching frequency f (i.e., the operating frequency): T=1/f. $T_p$ is the time of phase-shifting of the switch $Q_4$ with respect to the switch $Q_1$, and the phase-shifting angle θ may be represented by equation $$\theta = \frac{T_p}{T} 360°. \quad (1)$$

Referring to FIG. 3, equation $$s = \frac{\theta \cdot F_s}{f_{stop} - f_{start}}, \quad (2)$$

may be obtained, where s is a slope of the phase-shifting angle, $f_{start}$ is a mixed control start frequency, and $f_{stop}$ is a mixed control stop frequency. From equations (1) and (2), an equation (3) may be obtained as below:

$$T_p = \frac{s \cdot (f_{stop} - f_{start})}{360° \cdot f \cdot F_s},$$

where f is the operating frequency and $F_s$ is the resonant frequency of the resonant converter.

In this way, when setting appropriate $f_{start}$, $f_{stop}$ and s, the time delay $T_p$ of phase shifting may be obtained from equation (1), and thereby a control signal may be generated by $T_p$, $f_{start}$ and $f_{stop}$ for adjusting the operating frequency and the phase-shifting angle of the resonant convertor so as to realize the mixed control.

For the setting of $f_{start}$, $f_{stop}$ and s, statistics may be performed on results of a plurality of experiments to form a preferable linear path from point B to point C so as to ensure both the soft-switching of the circuit and a smaller circuit loss on this preferable linear path. For example, under a certain input and output condition, preferably, the phase-shifting angle is 90°, $f_{start}$ is 1.1 times as much as $F_s$ (i.e., the frequency ratio k is 1.1), $f_{stop}$ is twice as much as $F_s$ (i.e., the frequency ratio k is 2), and the slope "s" may be obtained by equation (2).

In this way, a mixed control method for a resonant converter according to an embodiment of the present application may include the following steps (see FIG. 7): S1. setting a mixed control start frequency, a mixed control stop frequency and a slope of a phase-shifting angle; S2. detecting an operating frequency of the resonant converter; S3. calculating a time delay of phase shifting according to the slope of the phase-shifting angle, the mixed control start frequency, the mixed control stop frequency and a resonant frequency of the resonant convertor; and S4. generating a control signal for adjusting both the operating frequency of the resonant converter and the phase-shifting angle according to the time delay of phase shifting, the mixed control start frequency and the mixed control stop frequency.

In the above step S3, for example, the time delay of phase shifting may be calculated by an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

Figure 7:
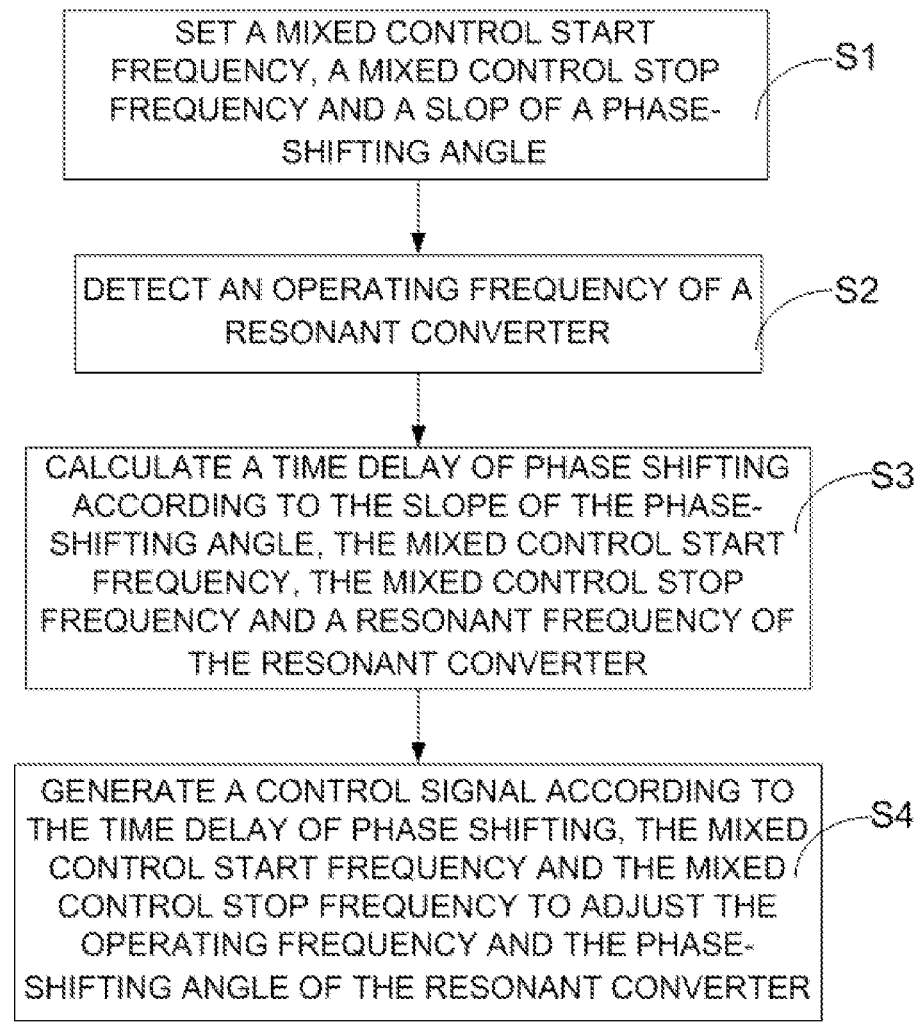
FIG. 7 is a flowchart of a mixed control method for a resonant converter according to an embodiment of the present application.

Those skilled in the art may understand that, step S2 may be performed at the same time with step S1, or may be performed after or before step S1. That is, those skilled in the art will understand that the contents shown in FIG. 7 are only for the purpose of illustration but not to impose any limitation on the execution sequence of the steps S1 and S2 in the present application.

Figure 8:
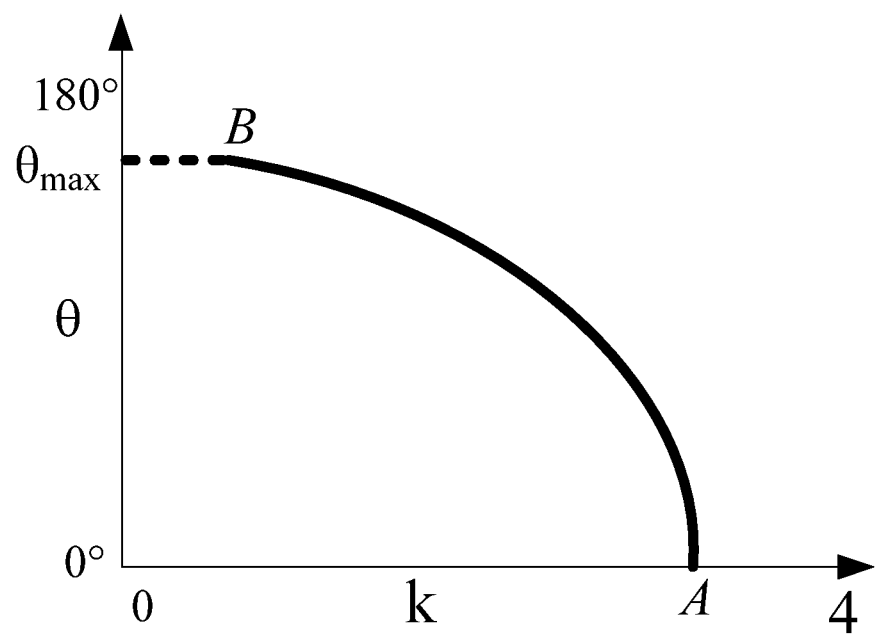
FIG. 8 shows a fitting curve of efficiency of a phase-shifting angle versus a frequency ratio under a certain output voltage.

FIG. 8 shows a fitted curve of the phase-shifting angle versus the frequency ratio under a certain output voltage condition, where the abscissa represents the frequency ratio k and the ordinate represents the phase-shifting angle θ. Specifically, in order to guarantee a constant output voltage, when the operation locus of the circuit is from A to B, the circuit is controlled to operate by changing the phase-shifting angle θ of the switches to realize a control with low voltage gain. Further, the larger the phase-shifting angle θ is, the lower the frequency ratio k is, and thus a diagram illustrating such corresponding relationship as shown in FIG. 8 is formed. Under this voltage, a low voltage gain and a control for the output current may be realized by performing the control of phase shifting plus frequency changing based on the points on this fitted curve. Here, the phase-shifting angle corresponding to point B is $\theta_{max}$. When the phase-shifting angle satisfies $\theta < \theta_{max}$, all the switches $Q_1$~$Q_4$ can realize ZVS. However, when the phase-shifting angle satisfies $\theta > \theta_{max}$, none of the switches $Q_1$~$Q_4$ can realize ZVS. Thus, the phase-shifting angle $\theta_{max}$, is defined as a maximum value of the phase-shifting angle under a certain output voltage condition.

Figure 9:
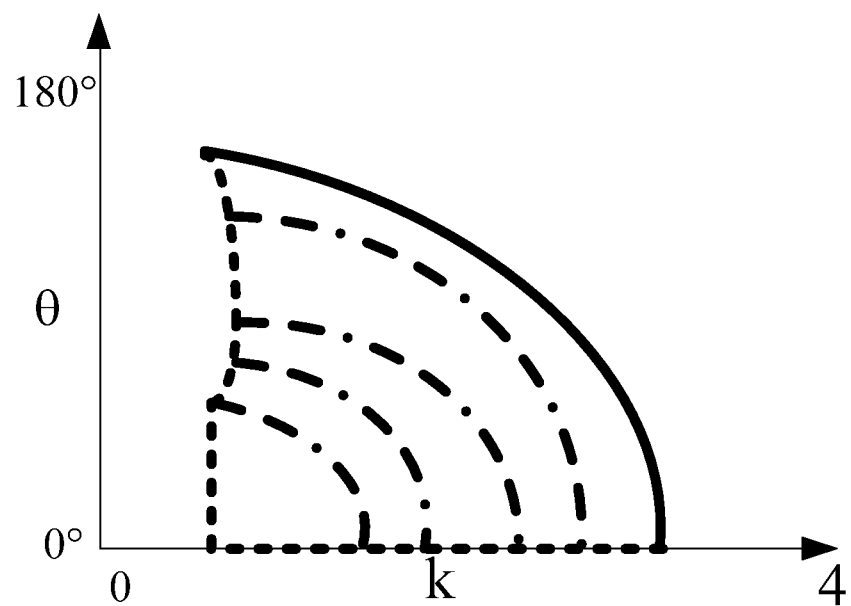
FIG. 9 shows fitting curves of efficiency of a phase-shifting angle versus a frequency ratio under different voltages.

FIG. 9 shows fitted curves of the phase-shifting angle versus the frequency ratio under different output voltage conditions, where the abscissa represents the frequency ratio k and the ordinate represents the phase-shifting angle θ. Respective dot-dash lines within the broken-line frame represent the allowable phase-shifting angles for the switches to realize the ZVS under different output voltage conditions.

Figure 10:
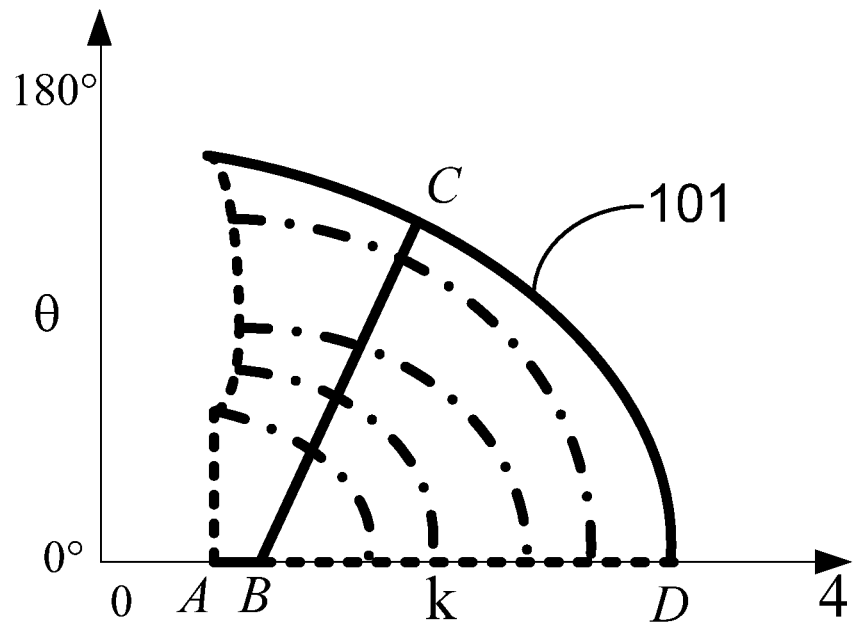
FIG. 10 is a schematic diagram illustrating a mixed control method obtained from the fitting curves.

FIG. 10 is a schematic diagram illustrating a mixed control method obtained based on the fitted curves, where the abscissa represents the frequency ratio k and the ordinate represents the phase-shifting angle θ. The circuit follows an operation locus as below: firstly, from point A to point B, the circuit is controlled to operate by changing the operating frequency f of switches, and then from point B to point C, the circuit is controlled to operate by adjusting the phase-shifting angle and the operating frequency of the switches. Point C is a point on a fitted curve 101 which has a phase-shifting angle less than $\theta_{max}$, and thus the phase variation from point B to point C can realize a soft-switching.

It can be seen from FIG. 10 that, if the control method for a resonant converter by only changing frequency is employed, it is required to increase the frequency to the frequency ratio at point D on the fitted curve 101 to realize a low voltage gain. However, by employing the mixed control method of phase shifting plus frequency changing, a low voltage gain may be realized when the frequency is increased to the frequency ratio corresponding to point C. Obviously, the frequency has a significant decrease so that a reduction in the circuit loss is realized and a soft-switching may be guaranteed at the same time, thereby improving the efficiency.

Figure 11:
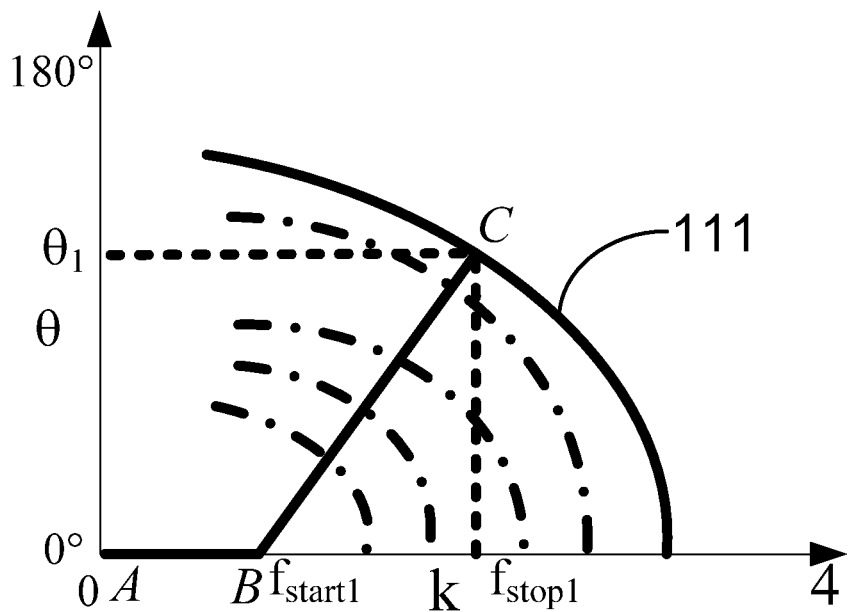
FIG. 11 shows fitting curves under an operating condition I.

FIG. 11 shows fitted curves under an operating condition I, where the abscissa represents the frequency ratio k and the ordinate represents the phase-shifting angle θ. Under the operating condition I, the maximum value of the output current is $I_{o1}$ (e.g., 20 A). Fitted curves under different output voltages are indicated by respective dot-dash lines. Here, description will be made using the fitted curve 111. In a case that the load is shorted (e.g., when the circuit is started), a phase-shifting angle $\theta_1$ is selected, which preferably is 60~120°, and most preferably is 90°. After determining the phase-shifting angle $\theta_1$, point C on the fitted curve 111 having a mixed control stop frequency $f_{stop1}$ can be determined. In the case that the phase-shifting angle θ is zero, the frequency at point B is the largest, i.e., point B has a mixed control start frequency $f_{start1}$. The mixed control start frequency $f_{start1}$ is preferably 1~1.3 times as much as $F_s$ (i.e., the frequency ratio is 1~1.3), and is most preferably 1.1 times (i.e., the frequency ratio is 1.1) as much as $F_s$. Further, here, point A is a point where the phase-shifting angle θ is zero and k is zero. The circuit follows an operation locus as below: firstly, from A to B, the circuit is controlled to operate by only changing operating frequency f of the switches, and then enter into the BC stage in which the circuit is controlled to operate by adjusting the phase-shifting angle θ and the operation frequency f of the switches.

Figure 12:
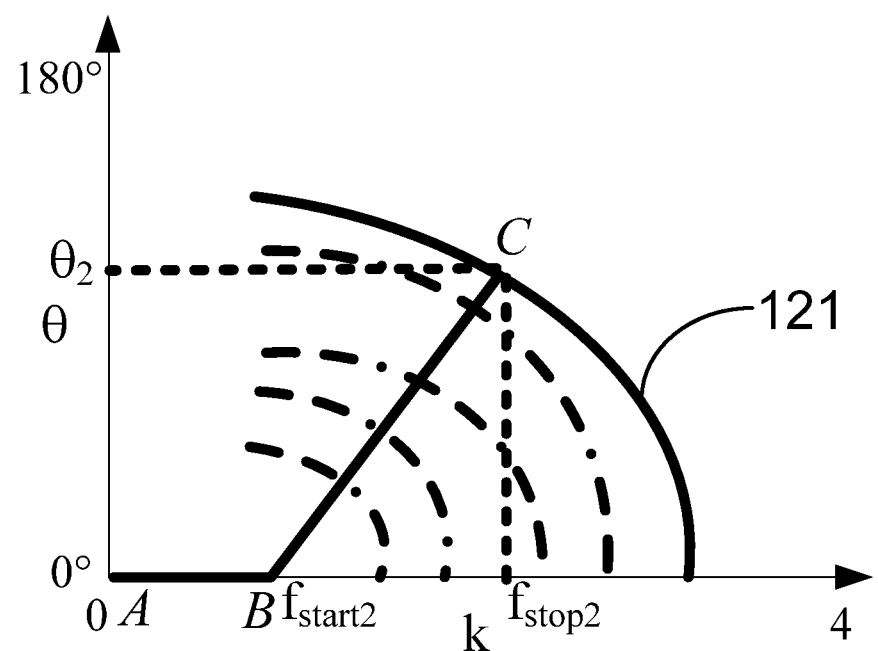
FIG. 12 shows fitting curves under an operating condition II.

FIG. 12 shows fitted curves under an operating condition II, where the abscissa represents the frequency ratio k and the ordinate represents the phase-shifting angle θ. Under the operating condition II, the maximum value of the output current is $I_{o2}$ (e.g., 10 A). Fitted curves under different output voltages are indicated by respective dot-cash lines. Here, description will be made using a fitted curve 121 having the same voltage as the fitted curve 111. In the case that the load is shorted (e.g., when the circuit is started), a phase-shifting angle $\theta_2$ is selected. After determining the phase-shifting angle $\theta_2$, point C, having a mixed control stop frequency $f_{stop2}$, on the fitted curve 121 can be determined. In the case that a phase-shifting angle θ is zero, the frequency at point B is the largest, i.e., point B has a mixed control start frequency $f_{start2}$. In this embodiment, point A is a point where the phase-shifting angle θ is zero and k is zero. The circuit follows an operation locus as below: firstly, from A to B, the circuit is controlled to operate by only changing operating frequency f of the switches, and then enter into the BC stage in which the circuit is controlled to operate by adjusting the phase-shifting angle θ and the operation frequency f of the switches.

An operating condition where the phase-shifting angle $\theta_2$ equals to $\theta_1$ is selected, and $f_{stop2}$ can be obtained according to the fitted curve 121 under the operating condition II. By setting $$\frac{f_{stop2}}{f_{start2}} = \frac{f_{stop1}}{f_{start1}},$$

and $f_{start1}$ is known, $f_{start2}$ may be calculated by $$f_{start2} = f_{stop2} \cdot \frac{f_{start1}}{f_{stop1}}.$$

Also, by setting $f_{start} = C_1 \cdot I_{o\_max} + C_2$ (4) and $f_{stop} = C_3 \cdot f_{start}$ (5), and $f_{start1}$, $f_{stop1}$, $I_{o1}$, $f_{start2}$, $f_{stop2}$ and $I_{o2}$ are known, $C_1$, $C_2$ and $C_3$ can be calculated by equations (4) and (5), and thus the range of $f_{start}$, $f_{stop}$ and $I_{o\_max}$ can be calculated. In this way, under the condition of any maximum value $I_{o\_max}$ of the output current between $I_{o1}$ and $I_{o2}$, $f_{start}$ and $f_{stop}$ can be calculated by equations (4) and (5). Further, by equation (6):

$$\theta = \frac{\theta_1 \cdot (f - f_{start})}{f_{stop} - f_{start}},$$

the phase-shifting angle can be calculated, where $\theta_1$ is a phase shift angle selected in the case that the load is shorted (e.g., when the circuit is started), which is preferably 60~120°, and most preferably is 90°, and f is the operating frequency.

Certainly, those skilled in the art may set two groups of mixed control start frequencies and mixed control stop frequencies in any other manners and calculate $C_1$, $C_2$ and $C_3$ by equations (4) and (5).

Figure 13:
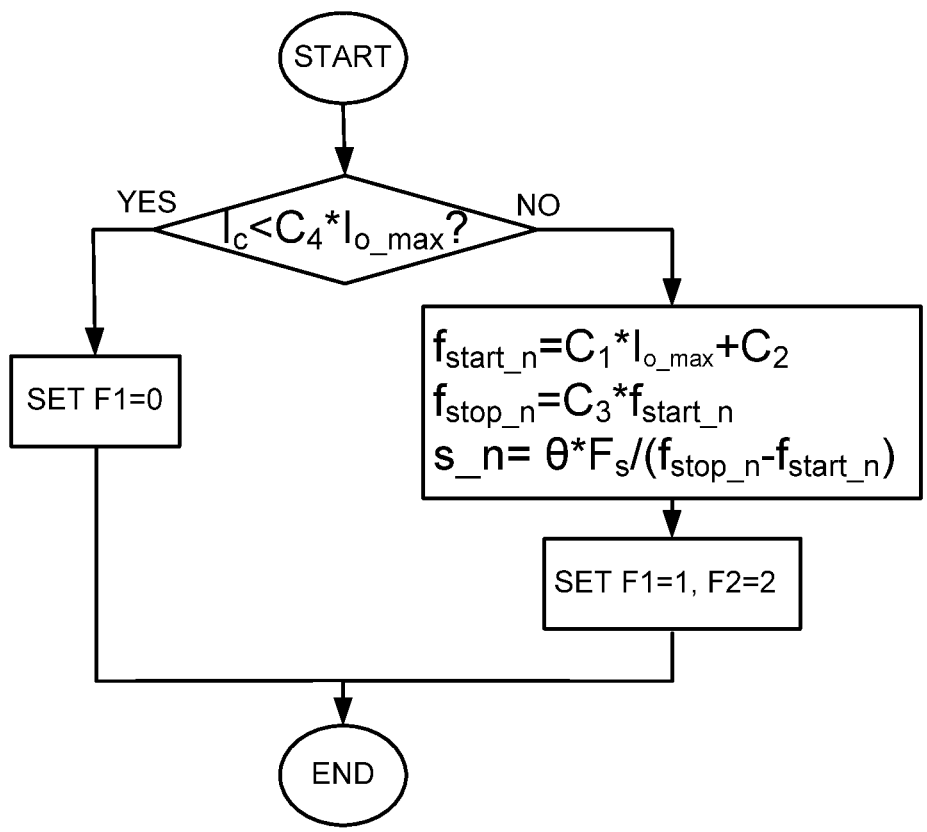
FIG. 13 is a flowchart illustrating parameter settings of a mixed control method according to an embodiment of the present application.

FIG. 13 is a flowchart illustrating parameter settings of a mixed control method according to an embodiment of the present application. In the present embodiment, identifiers F1 and F2 are provided. F1 is an identifier for indicating control manner, when F1=0, indicating a frequency changing control; and when F1=1, indicating a mixed control of frequency changing plus phase shifting. F2 is an identifier for indicating parameter update, when F2=0, indicating not updating $f_{start}$ and s; and when F2=1, indicating updating $f_{start}$ and s.

Firstly, it is judged whether a value $I_o$ of an output current of a resonant converter is less than $C_4 * I_{o\_max}$, where $C_4$ is a constant between 0 and 1, preferably is a constant between 0.8 and 1, and $I_{o\_max}$ is a maximum value of the output current of the resonant converter when a voltage gain is greater than or equal to a predetermined value.

If the judgment result is yes, F1 is set as 0, i.e., the frequency changing control manner is selected, and the procedure ends. If $I_o$ is not less than $C_4 * I_{o\_max}$, the calculation based on equations $f_{start\_n} = C_1 \cdot I_{o\_max} + C_2$, $f_{stop\_n} = C_3 \cdot f_{start\_n}$ and $$s\_n = \frac{\theta \cdot F_S}{f_{stop\_n} - f_{start\_n}}$$

is performed, where $f_{start\_n}$ a new mixed control start frequency, $f_{stop\_n}$ is a new mixed control stop frequency, s_n is a new slope of a phase-shifting angle, $\theta$ is a set phase-shifting angle. And F1 is set as 1, i.e., the mixed control method of frequency changing plus phase shifting is selected. Further, F2 is set as 1, i.e., $f_{start}$ and s is selected to be updated, and then the procedure ends.

Figure 14:
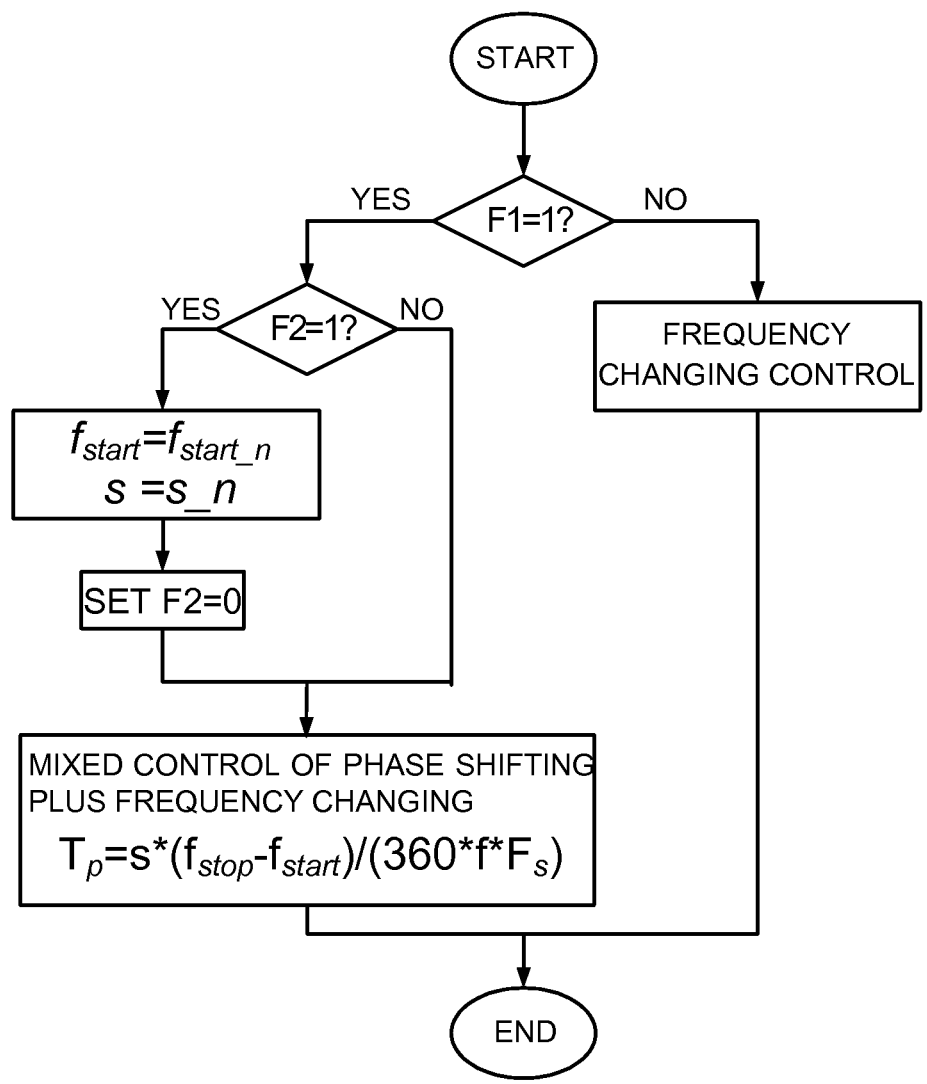
FIG. 14 is a flowchart illustrating settings of a time delay of phase shifting in a mixed control method according to an embodiment of the present application.

FIG. 14 is a flowchart illustrating setting a time delay of phase shifting in a mixed control method according to an embodiment of the present application. Firstly, it is judged whether F1 equals to 0. If F1 equals to 0, the procedure enters into the frequency changing control process and then the procedure ends. If F1 equals to 1 and F2 equals to 0, the procedure enters into the mixed control process of frequency changing plus phase shifting and performs calculations based on $$T_p = \frac{\text{slope} \cdot (f_{stop} - f_{start})}{360° \cdot f \cdot F_s},$$

and then the procedure ends.

If F1 equals to 1 and F2 equals to 1, $f_{start} = f_{start\_n}$, s=s_n, i.e., the parameters $f_{start}$ and s are updated and F2 is set as 0, then the procedure enters into the mixed control process of frequency changing plus phase shifting and performs calculations based on $$T_p = \frac{\text{slope} \cdot (f_{stop} - f_{start})}{360° \cdot f \cdot F_s},$$

and then the procedure ends.

Figure 15:
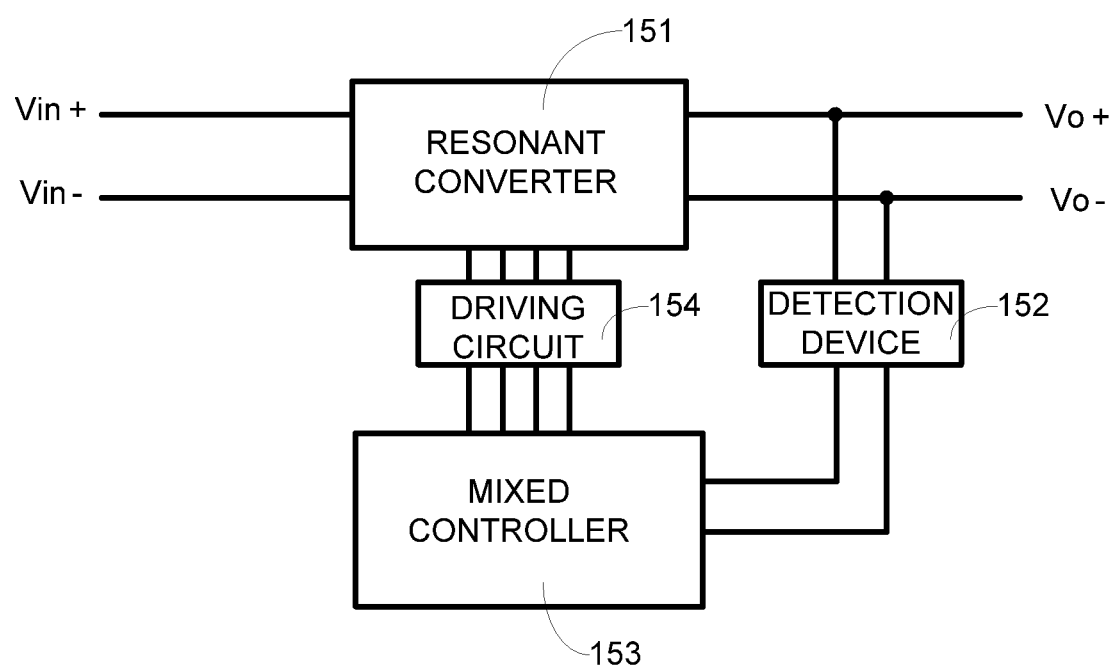
FIG. 15 shows a resonant converter system according to an embodiment of the present application.

As shown in FIG. 15, the present application further proposes a resonant converter system. The system includes: a resonant converter 151 which receives an input voltage and outputs an output voltage; a detection device 152 which detects an operating frequency of the resonant converter 151; and a mixed controller 153 which, when the resonant converter 151 operates in a case where a voltage gain is less than a predetermined value, calculates a time delay of phase shifting according to a mixed control start frequency, a mixed control stop frequency and a slope of a phase-shifting angle which are set in advance as well as the operating frequency, and generates a control signal according to the time delay of phase shifting, the mixed control start frequency and the mixed control stop frequency to adjust the operating frequency and phase-shifting angle of the resonant converter. The mixed controller 153 may include a receiving port for receiving an operating frequency signal of the resonant converter so as to obtain the operating frequency of the resonant converter.

The mixed controller 153 may calculate the time delay of phase shifting based on an equation $$T_p = \frac{s \cdot (f_{stop} - f_{start})}{360° \cdot f \cdot F_s},$$

where s is the slope of the phase-shifting angle, $f_{start}$ is the mixed control start frequency, and $f_{stop}$ is the mixed control stop frequency, f is the operating frequency, $F_s$ is the resonant frequency of the resonant converter, and $T_p$ is the time delay of phase shifting.

The resonant converter 151 may be a DC/DC resonant converter or a DC/AC resonant converter. For example, the resonant converter 151 may be the LLC circuit structure described in the above embodiments regarding the method.

The resonant converter system may further include a driving circuit 154 which is connected between the mixed controller 153 and the resonant converter 151. In an embodiment, the detection device 152 obtains the operating frequency of the resonant converter 151 by using an output current of the resonant converter 151 and inputs the operating frequency into the mixed controller 153. The control signal obtained through the calculations by the mixed controller 153 is sent to the driving circuit 154. The switching elements in the resonant converter 151 are driven by the driving circuit 154 to realize the mixed control.

As to the implemental details of the resonant converter system and the mixed controller, the specific description regarding the embodiments of the method may be referred to and the repetitive description is omitted.

Although the present application has been described with reference to typical embodiments, it should be understood that the terminologies herein are for illustration purposes rather than to limit the present application. The present application can be implemented in many specific embodiments without departing from the spirit and scope of the present application, and thus it shall be appreciated that the above embodiments shall not be limited to any details described above, but shall be interpreted broadly within the spirit and scope defined by the appended claims. The appended claims intend to cover all the modifications and changes falling within the scope of the appended claims and equivalents thereof.

What is claimed is:

1. A mixed control method for a resonant converter, when the resonant converter operates in a case where a voltage gain is less than a predetermined value, the method comprises the steps of:

setting a mixed control start frequency, a mixed control stop frequency and a slope of a phase-shifting angle;

detecting an operating frequency of the resonant converter;

calculating a time delay of phase shifting according to the slope of the phase-shifting angle, the mixed control start frequency, the mixed control stop frequency and a resonant frequency of the resonant converter; and generating a control signal to adjust the operating frequency and the phase-shifting angle of the resonant converter according to the time delay of phase shifting, the mixed control start frequency and the mixed control stop frequency.

2. The mixed control method according to claim 1, wherein the step of calculating the time delay of phase shifting comprises a step of:

calculating the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

3. The mixed control method according to claim 2, wherein the case when the voltage gain is less than the predetermined value is the case when a value of an output current of the resonant converter is greater than or equal to $C_4 * I_{o\_max}$, where $C_4$ is a constant between 0 and 1, and $I_{o\_max}$ is a maximum value of the output current of the resonant converter when the voltage gain is greater than or equal to the predetermined value.

4. The mixed control method according to claim 3, wherein when the value of the output current of the resonant converter is less than $C_4 * I_{o\_max}$, a frequency changing control is performed on the resonant converter.

5. The mixed control method according to claim 2, wherein the mixed control start frequency and the mixed control stop frequency are set by the following two equations respectively:

$$f_{start} = C_1 \cdot I_{o\_max} + C_2,$$

$$f_{stop} = C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and $C_1$, $C_2$ and $C_3$ are calculated by two groups of mixed control start frequencies and mixed control stop frequencies which are set in advance.

6. The mixed control method according to claim 5, wherein the slope of the phase-shifting angle is obtained according to an equation $$s = \frac{\theta \cdot F_S}{f_{stop} - f_{start}},$$

where θ is a predetermined phase-shifting angle;

two predetermined mixed control stop frequencies are a first mixed control stop frequency $f_{stop1}$ and a second mixed control stop frequency $f_{stop2}$, which are obtained by the following steps of:

under the same output voltage of the resonant converter, setting a first pre-set phase-shifting angle under a first maximum value of the output current and a second pre-set phase-shifting angle under a second maximum value of the output current; and in order to control the output current in the case where the voltage gain is less than the predetermined value, using frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

7. The mixed control method according to claim 6, wherein the first pre-set phase-shifting angle and the second pre-set phase-shifting angle are equal.

8. The mixed control method according to claim 7, wherein both of the first pre-set phase-shifting angle and the second pre-set phase-shifting angle are 60~120°.

9. The mixed control method according to claim 8, wherein both of the first pre-set phase-shifting angle and the second pre-set phase-shifting angle are 90°.

10. The mixed control method according to claim 6, wherein two mixed control start frequencies which are set in advance are a first mixed control start frequency $f_{start1}$ and a second mixed control start $f_{start2}$, frequency which are obtained by the following steps of:

setting the first mixed control start frequency $f_{start1}$ as 1~1.3 times as much as the resonant frequency $F_s$, and calculating the second mixed control start frequency $f_{start2}$ by an equation $$f_{start2} = f_{stop2} \cdot \frac{f_{start1}}{f_{stop1}}.$$

11. The mixed control method according to claim 10, wherein the first mixed control start frequency $f_{start1}$ is 1.1 times as much as the resonant frequency $F_s$.

12. A resonant converter system, comprising:

a resonant converter;

a detection device, configured to detect an operating frequency of the resonant converter; and a mixed controller, configured to calculate a time delay of phase shifting according to a mixed control start frequency, a mixed control stop frequency and a slope of a phase-shifting angle which are set in advance and the operating frequency, and to generate a control signal according to the time delay of phase shifting, the mixed control start frequency and the mixed control stop frequency to adjust the operating frequency and phase-shifting angle of the resonant converter, when the resonant converter operates in a case where a voltage gain is less than a predetermined value.

13. The resonant converter system according to claim 12, wherein the mixed controller is configured to calculate the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

14. The resonant converter system according to claim 13, wherein the case when a voltage gain is less than a predetermined value is a case when a value of an output current of the resonant converter is greater than or equal to $C_4 * I_{o\_max}$, where $C_4$ is a constant between 0 and 1, and $I_{o\_max}$ is a maximum value of the output current of the resonant converter when the voltage gain is greater than or equal to the predetermined value.

15. The resonant converter according to claim 14, wherein the mixed controller is configured to perform a frequency changing control on the resonant converter when the value of the output current of the resonant converter is less than $C_4 * I_{o\_max}$.

16. The resonant converter according to claim 13, wherein the mixed control start frequency and the mixed control stop frequency are set by the following two equations respectively:

$$f_{start} = C_1 \cdot I_{o\_max} + C_2,$$

$$f_{stop} = C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and the constants $C_1$, $C_2$ and $C_3$ are calculated by two groups of mixed control start frequencies and mixed control stop frequencies which are set in advance.

17. The resonant converter according to claim 16, wherein the slope of the phase-shifting angle is obtained according to an equation $$s = \frac{\theta \cdot F_S}{f_{stop} - f_{start}},$$

where $\theta$ is a pre-set phase-shifting angle;
two mixed control stop frequencies which are set in advance are a first mixed control stop frequency $f_{stop1}$ and a second mixed control stop frequency $f_{stop2}$,
the mixed controller is configured to set, under the same output voltage of the resonant converter, a first pre-set phase-shifting angle under a first maximum value of the output current and a second pre-set phase-shifting angle under a second maximum value of the output current, and in order to control the output current in the case where the voltage gain is less than the predetermined value, to use frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

18. The resonant converter according to claim 17, wherein the first pre-set phase-shifting angle equals to the second pre-set phase-shifting angle.

19. The resonant converter according to claim 18, wherein both of the first pre-set phase-shifting angle and the second pre-set phase-shifting angle are 60~120°.

20. The resonant converter according to claim 19, wherein both of the first pre-set phase-shifting angle and the second pre-set phase-shifting angle are 90°.

21. The resonant converter according to claim 17, wherein two mixed control start frequencies which are set in advance are a first mixed control start frequency $f_{start1}$ and a second mixed control start frequency $f_{start2}$,
the mixed controller is configured to set the first mixed control start frequency $f_{start1}$ as 1~1.3 times as much as the resonant frequency $F_s$, and to calculate the second mixed control start frequency by an equation $$f_{start2} = f_{stop2} \cdot \frac{f_{start1}}{f_{stop1}}.$$

22. The resonant converter according to claim 21, wherein the first mixed control start frequency $f_{start1}$ is 1.1 times as much as the resonant frequency $F_s$.

23. A mixed controller, comprising a receiving port being configured to receive an operating frequency signal of a resonant converter so as to obtain an operating frequency of the resonant converter; and
when the resonant converter operates in a case where a voltage gain is less than a predetermined value, the mixed controller is configured to calculate a time delay of phase shifting according to a mixed control start frequency, a mixed control stop frequency and a slope of a phase-shifting angle which are set in advance and the operating frequency, and to generate a control signal according to the time delay of phase shifting, the mixed control start frequency and the mixed control stop frequency to adjust the operating frequency and phase-shifting angle of the resonant converter.

24. The mixed controller according to claim 23, wherein the mixed controller is configured to calculate the time delay of phase shifting according to an equation $$T_p = \frac{s \cdot (f_{stop} - f_{start})}{360° \cdot f \cdot F_s},$$

where s is the slope of the phase-shifting angle, $f_{start}$ is the mixed control start frequency, $f_{stop}$ is the mixed control stop frequency, f is the operating frequency, $F_s$ is the resonant frequency of the resonant converter, and $T_p$ is the time delay of phase shifting.

25. The mixed controller according to claim 23, wherein the case when a voltage gain is less than a predetermined value is a case when a value of an output current of the resonant converter is greater than or equal to $C_4 * I_{o\_max}$, where $C_4$ is a constant between 0 and 1, and $I_{o\_max}$ is a maximum value of the output current of the resonant converter when the voltage gain is greater than or equal to the predetermined value.

26. The mixed controller according to claim 24, wherein the mixed controller is configured to perform a frequency changing control on the resonant converter when the value of the output current of the resonant converter is less than $C_4 * I_{o\_max}$.

27. The mixed controller according to claim 24, wherein the mixed control start frequency and the mixed control stop frequency are set by the following two equations respectively:

$$f_{start} = C_1 \cdot I_{o\_max} + C_2,$$

$$f_{stop} = C_3 \cdot f_{start},$$

where $I_{o\_max}$ is a maximum value of the output current of the resonant converter when the voltage gain is greater than or equal to the predetermined value, $C_1$ is a first constant, $C_2$ is a second constant, $C_3$ is a third constant, and the constants $C_1$, $C_2$ and $C_3$ are calculated by two groups of mixed control start frequencies and mixed control stop frequencies which are set in advance.

28. The mixed controller according to claim 27, wherein the slope of the phase-shifting angle is obtained according to an equation $$s = \frac{\theta \cdot F_S}{f_{stop} - f_{start}},$$

where θ is a pre-set phase-shifting angle;
- two mixed control stop frequencies which are set in advance are a first mixed control stop frequency $f_{stop1}$ and a second mixed control stop frequency $f_{stop2}$,
- the mixed controller is configured to set, under the same output voltage of the resonant converter, a first pre-set phase-shifting angle under a first maximum value of the output current and a second pre-set phase-shifting angle under a second maximum value of the output current, and in order to control the output current in the case where the voltage gain is less than the predetermined value, to use frequencies, which correspond to the first pre-set phase-shifting angle and the second pre-set phase-shifting angle respectively, as the first mixed control stop frequency $f_{stop1}$ and the second mixed control stop frequency $f_{stop2}$ respectively.

29. The mixed controller according to claim 28, wherein the first pre-set phase-shifting angle equals to the second pre-set phase-shifting angle.

30. The mixed controller according to claim 29, wherein both of the first pre-set phase-shifting angle and the second pre-set phase-shifting angle are 60~120°.

31. The mixed controller according to claim 30, wherein both of the first pre-set phase-shifting angle and the second pre-set phase-shifting angle are 90°.

32. The mixed controller according to claim 28, wherein two mixed control start frequencies which are set in advance are a first mixed control start frequency $f_{start1}$ and a second mixed control start frequency $f_{start2}$,
- the mixed controller is configured to set the first mixed control start frequency $f_{start1}$ as 1~1.3 times as much as the resonant frequency $F_s$, and to calculate the second mixed control start frequency by an equation $$f_{start2} = f_{stop2} \cdot \frac{f_{start1}}{f_{stop1}}.$$

33. The mixed controller according to claim 32, wherein the first mixed control start frequency $f_{start1}$ is 1.1 times as much as the resonant frequency $F_s$.

* * * * *